US011524338B2

(12) United States Patent
Shinagawa et al.

(10) Patent No.: US 11,524,338 B2
(45) Date of Patent: Dec. 13, 2022

(54) THREE-DIMENSIONAL MODELING DEVICE

(71) Applicant: IHI Corporation, Tokyo (JP)

(72) Inventors: Miki Shinagawa, Tokyo (JP); Yuichiro Nakayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 16 days.

(21) Appl. No.: 17/253,722

(22) PCT Filed: Jun. 26, 2019

(86) PCT No.: PCT/JP2019/025482
§ 371 (c)(1),
(2) Date: Dec. 18, 2020

(87) PCT Pub. No.: WO2020/004507
PCT Pub. Date: Jan. 2, 2020

(65) Prior Publication Data
US 2021/0187619 A1    Jun. 24, 2021

(30) Foreign Application Priority Data

Jun. 26, 2018   (JP) .............................. JP2018-120674

(51) Int. Cl.
*B22F 3/105*          (2006.01)
*B23K 26/342*       (2014.01)
(Continued)

(52) U.S. Cl.
CPC ............ *B22F 12/226* (2021.01); *B22F 12/13* (2021.01); *B22F 12/37* (2021.01); *B22F 12/41* (2021.01);
(Continued)

(58) Field of Classification Search
CPC ....... B22F 10/20; B29C 64/153; B33Y 30/00; B23K 26/342
See application file for complete search history.

(56) References Cited

U.S. PATENT DOCUMENTS 8,172,562 B2 *  5/2012  Mattes ................. B29C 64/153
                                                              425/375
9,415,443 B2 *  8/2016  Ljungblad .............. B33Y 10/00
(Continued)

FOREIGN PATENT DOCUMENTS

DE          10235434 A1     2/2004
DE       102014221885 A1    4/2016
(Continued)

OTHER PUBLICATIONS

C. Hauser, D.M. Lewis, M. Dunschen, M. Egan, C. Sutcliffe,"Image Transformations and Printing of Plasterlayers in Spiral Growth Manufacturing", 2005International Solid Freeform Fabrication Symposiumhttps://repositories.lib.utexas.edu/handle/2152/80040, 2005, p. 147-p. 158.
(Continued)

*Primary Examiner* — Helena Kosanovic
*Assistant Examiner* — Lawrence H Samuels
(74) *Attorney, Agent, or Firm* — Volpe Koenig

(57) ABSTRACT

A three-dimensional modeling device includes a table supporting a powder material and a model created from the powder material, a processing section disposed so as to face the table and obtaining the model by processing the powder material, and a rotation unit causing the table to rotate relative to the processing section around a rotary axis. The processing section has a plurality of processing units disposed around the rotary axis. The processing units supply the powder material to the table, preheat the supplied powder material, and emit an energy beam to the preheated powder material.

12 Claims, 9 Drawing Sheets

(51) Int. Cl.
- *B22F 12/00* (2021.01)
- *B22F 12/37* (2021.01)
- *B22F 12/41* (2021.01)
- *B22F 12/90* (2021.01)
- *B22F 12/13* (2021.01)
- *B33Y 30/00* (2015.01)
- *B33Y 40/10* (2020.01)

(52) U.S. Cl.
CPC .............. *B22F 12/90* (2021.01); *B33Y 30/00* (2014.12); *B33Y 40/10* (2020.01)

(56) References Cited

U.S. PATENT DOCUMENTS

| | | | |
|---|---|---|---|
| 10,786,865 B2* | 9/2020 | Hellestam | B23K 15/0086 |
| 2004/0265413 A1* | 12/2004 | Russell | B41J 2/16579 |
| | | | 425/375 |
| 2006/0108712 A1* | 5/2006 | Mattes | B22F 10/20 |
| | | | 425/375 |
| 2008/0042321 A1 | 2/2008 | Russell et al. | |
| 2010/0007062 A1* | 1/2010 | Larsson | B29C 64/153 |
| | | | 264/485 |
| 2012/0211926 A1 | 8/2012 | Larsson et al. | |
| 2013/0186514 A1* | 7/2013 | Zhuang | B29C 64/153 |
| | | | 141/82 |
| 2014/0348691 A1* | 11/2014 | Ljungblad | B29C 64/153 |
| | | | 419/53 |
| 2015/0004045 A1* | 1/2015 | Ljungblad | B22F 3/1035 |
| | | | 425/78 |
| 2015/0158251 A1* | 6/2015 | Carrouset | B29C 64/255 |
| | | | 700/119 |
| 2015/0209889 A1 | 7/2015 | Peters et al. | |
| 2015/0209905 A1 | 7/2015 | Matthews et al. | |
| 2015/0209906 A1 | 7/2015 | Denney et al. | |
| 2015/0209907 A1 | 7/2015 | Narayanan et al. | |
| 2015/0209908 A1 | 7/2015 | Peters et al. | |
| 2015/0209910 A1 | 7/2015 | Denney et al. | |
| 2015/0209913 A1 | 7/2015 | Denney et al. | |
| 2016/0167160 A1* | 6/2016 | Hellestam | B22F 10/20 |
| | | | 219/76.12 |
| 2016/0167303 A1* | 6/2016 | Petelet | B29C 64/268 |
| | | | 219/76.12 |
| 2016/0193695 A1 | 7/2016 | Haynes | |
| 2017/0106445 A1* | 4/2017 | Schwarze | B22F 12/00 |
| 2017/0348902 A1* | 12/2017 | Ohara | B33Y 30/00 |
| 2020/0238432 A1* | 7/2020 | Hayashi | B29C 64/209 |
| 2020/0307084 A1* | 10/2020 | Kajita | B29C 64/268 |
| 2020/0346407 A1* | 11/2020 | Goodwin | B29C 64/241 |

FOREIGN PATENT DOCUMENTS

| | | |
|---|---|---|
| DE | 102016214249 A1 | 2/2018 |
| IT | UA20163108 A1 | 11/2017 |
| JP | 2005-534543 A | 11/2005 |
| JP | 2007-503342 A | 2/2007 |
| JP | 2009-544501 A | 12/2009 |
| JP | 2015-533650 A | 11/2015 |
| JP | 2015-533680 A | 11/2015 |
| JP | 2016-526098 A | 9/2016 |
| JP | 2016-529389 A | 9/2016 |
| JP | 2016-179500 A | 10/2016 |
| JP | 2018-507957 A | 3/2018 |
| WO | 2016/096407 A1 | 6/2016 |

OTHER PUBLICATIONS

C. Hauser, C. Sutcliffe, M. Egan and P. Fox., "Spiral Growthmanufacturing (SGM)—A Continuous Additivemanufacturing Technology for Processing Metalpowder by Selective Laser Melting.", 2007International Solid Freeform Fabrication Symposiumhttps://repositories.lib.utexas.edu/handle/2152/80182, 2007, p. 1-p. 12.

Extended European Search Report dated Oct. 22, 2021 for European Patent Application No. 19827281.7.

* cited by examiner

THREE-DIMENSIONAL MODELING DEVICE

TECHNICAL FIELD

The present disclosure relates to a three-dimensional modeling device.

BACKGROUND ART

Patent Literature 1 to Patent Literature 8 disclose techniques related to three-dimensional modeling. For example, Patent Literature 1 discloses a technique for manufacturing a three-dimensional model by irradiating a powder material with laser or a beam. Patent Literature 2 discloses a technique for performing continuous modeling around a rotating production table. Patent Literature 3 discloses a technique for supplying a material from a recoater blade rotationally driven with respect to each of a plurality of build chambers with a powder bed including the annularly disposed build chambers. Patent Literature 4 and Patent Literature 5 disclose techniques for simultaneously irradiating different places with two beams. Patent Literature 6 discloses a processing technique for irradiating a workpiece with laser while moving the workpiece.

CITATION LIST

Patent Literature

Patent Literature 1: Japanese Unexamined Patent Publication No. 2009-544501
Patent Literature 2: Japanese Unexamined Patent Publication No. 2007-503342
Patent Literature 3: Japanese Unexamined Patent Publication No. 2015-533650
Patent Literature 4: Japanese Unexamined Patent Publication No. 2016-529389
Patent Literature 5: Japanese Unexamined Patent Publication No. 2016-526098
Patent Literature 6: Japanese Unexamined Patent Publication No. 2016-179500
Patent Literature 7: Japanese Unexamined Patent Publication No. 2005-534543
Patent Literature 8: Japanese Unexamined Patent Publication No. 2018-507957

SUMMARY OF INVENTION

Technical Problem

In the technical field, it is desired to shorten the modeling time. For example, Patent Literature 7 and Patent Literature 8 disclose techniques focusing on shortening the modeling time. In this regard, the present disclosure describes a three-dimensional modeling device capable of further shortening the modeling time.

Solution to Problem

A three-dimensional modeling device according to one aspect of the present disclosure includes a table supporting a powder material and a model created from the powder material, a processing section disposed so as to face the table and obtaining the model by processing the powder material, and a rotation drive unit causing one of the table and the processing section to rotate relative to the other around a rotary axis. The processing section has a plurality of processing units disposed around the rotary axis. The processing units supply the powder material to the table, preheat the supplied powder material, and emit an energy beam to the preheated powder material.

Effects of Invention

With the three-dimensional modeling device according to the present disclosure, it is possible to shorten the modeling time.

DESCRIPTION OF EMBODIMENTS

Figure 1:
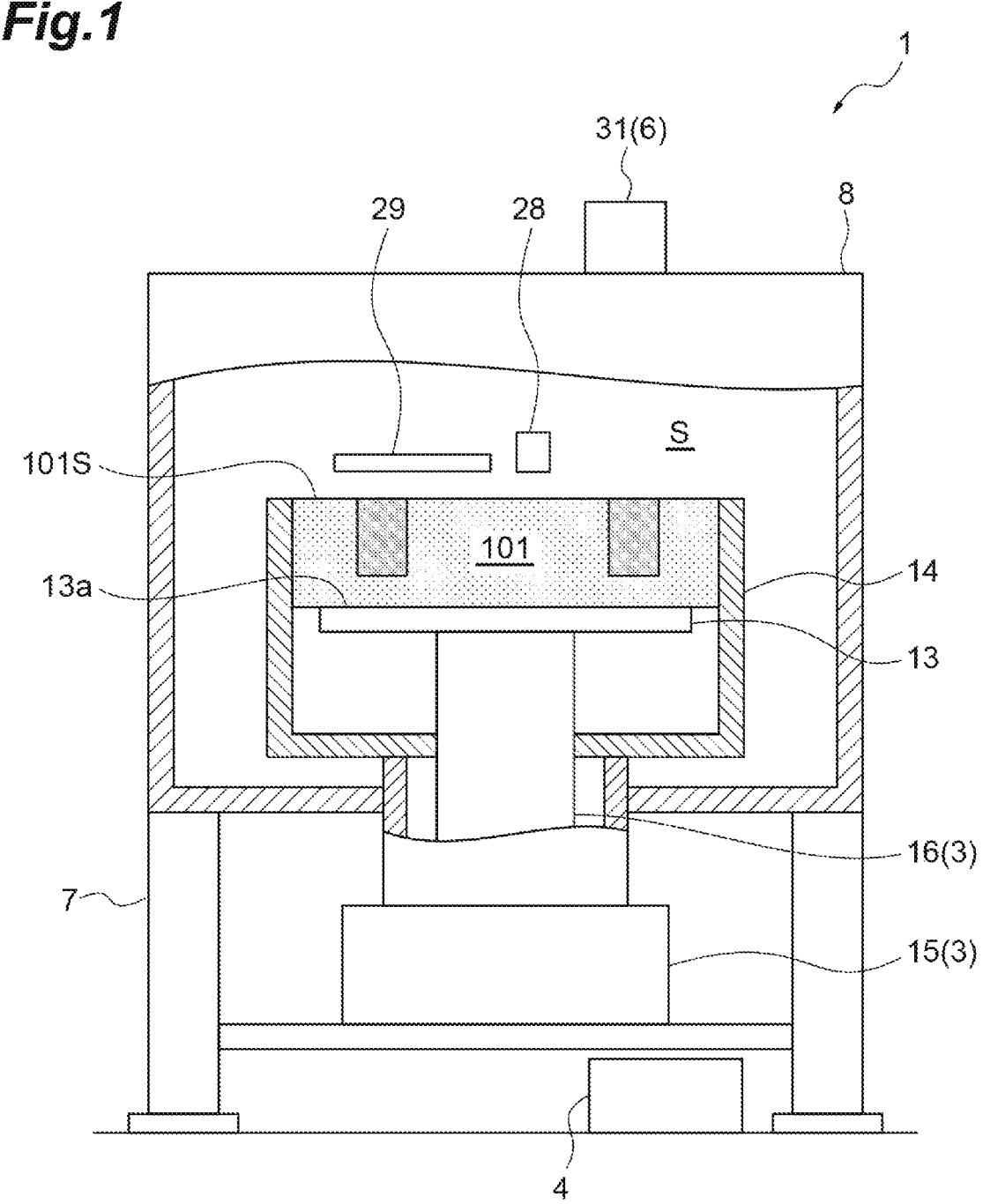
FIG. 1 is a diagram illustrating a cross section of a three-dimensional modeling device according to a first embodiment.

Hereinafter, the form of the three-dimensional modeling device of the present disclosure will be described in detail with reference to the accompanying drawings. In the description of the drawings, the same elements are denoted by the same reference numerals with redundant description omitted.

The three-dimensional modeling device according to one aspect of the present disclosure includes a table supporting a powder material and a model created from the powder material, a processing section disposed so as to face the table and obtaining the model by processing the powder material, and a rotation drive unit causing one of the table and the processing section to rotate relative to the other around a rotary axis. The processing section has a plurality of processing units disposed around the rotary axis. The processing units supply the powder material to the table, preheat the supplied powder material, and emit an energy beam to the preheated powder material.

The processing units of this device supply the powder material to the table, preheat the powder material, and emit the energy beam to the powder material. Further, the plurality of processing units performing these operations are disposed around the rotary axis. As a result, it is possible to carry out the supply operation by one processing unit and the supply operation by another processing unit in parallel. Likewise, it is possible to carry out the preheating operation by one processing unit and the preheating operation by another processing unit in parallel. Further, it is possible to carry out the modeling operation by one processing unit and the modeling operation by another processing unit in parallel. Accordingly, the modeling time can be further shortened.

The processing unit of the three-dimensional modeling device may include a first beam providing unit and a second beam providing unit providing the energy beam. A distance from the rotary axis to the second beam providing unit may be shorter than a distance from the rotary axis to the first beam providing unit. With this configuration, it is possible to divide the model into outer and inner peripheral parts with respect to the rotary axis in modeling the model.

The first beam providing unit of the three-dimensional modeling device may be disposed upstream of the second beam providing unit along a direction of rotation provided by the rotation drive unit. In this configuration, the outer peripheral side part of the model is modeled first. In other words, the temperature of the outer peripheral part rises before the temperature of the inner peripheral part rises. As a result, the temperature of the outer peripheral part is kept high for a long time. Accordingly, a decrease in the temperature of the model is suppressed with ease.

The processing unit of the three-dimensional modeling device may have a first preheating unit and a second preheating unit preheating the powder material. The first preheating unit and the first beam providing unit may be disposed in this order along a direction of rotation provided by the rotation drive unit. The second preheating unit and the second beam providing unit may be disposed in this order along the direction of rotation provided by the rotation drive unit. In this configuration, the powder material that is provided to the first beam providing unit can be reliably preheated by the first preheating unit. Likewise, the powder material that is provided to the second beam providing unit can be reliably preheated by the second preheating unit.

The processing unit of the three-dimensional modeling device may have a first postheating unit and a second postheating unit postheating the model. The first beam providing unit and the first postheating unit may be disposed in this order along the direction of rotation provided by the rotation drive unit. The second beam providing unit and the second postheating unit may be disposed in this order along the direction of rotation provided by the rotation drive unit. In this configuration, the temperature of the model is maintained by the first postheating unit and the second postheating unit. Accordingly, it is possible to suppress a decrease in the temperature of the powder material that is further supplied as well as the model.

In the three-dimensional modeling device, a temperature of the powder material preheated by the first preheating unit may be equal to a temperature of the model postheated by the first postheating unit. With this configuration, it is possible to reduce the temperature difference between the temperature of the powder material and the temperature of the model.

In the three-dimensional modeling device, the temperature of the powder material preheated by the first preheating unit may be different from the temperature of the model postheated by the first postheating unit. With this configuration, it is possible to set the temperature difference between the temperature of the powder material and the temperature of the model to a desired value.

In the three-dimensional modeling device, a temperature of the powder material preheated by the second preheating unit may be equal to a temperature of the model heated by the second postheating unit. With this configuration, it is possible to reduce the temperature difference between the temperature of the powder material and the temperature of the model.

In the three-dimensional modeling device, a temperature of the powder material preheated by the second preheating unit may be different from a temperature of the model heated by the second postheating unit. With this configuration, it is possible to set the temperature difference between the temperature of the powder material and the temperature of the model to a desired value.

The three-dimensional modeling device may further include a control unit controlling the processing section and the rotation drive unit. The processing unit may have a material supply unit supplying the powder material to a supply region set on a main surface of the table and a beam providing unit emitting the energy beam to a modeling region set downstream of the supply region along a direction of rotation provided by the rotation drive unit on the main surface of the table. The control unit may control the rotation drive unit to perform a rotation operation of rotating one of the table and the processing section relative to the other, control the material supply unit to perform a supply operation of supplying the powder material to the supply region, and control the beam providing unit to perform a modeling operation of emitting the energy beam to the modeling region. In this configuration, the operations for modeling the model are performed in different regions. Accordingly, each operation can be executed in parallel. As a result, the modeling time can be shortened as compared with a case where the model is modeled by each operation being sequentially performed.

The control unit of the three-dimensional modeling device may perform the rotation operation, the supply operation, and the modeling operation in parallel. With this configuration, it is possible to preferably shorten the modeling time.

The three-dimensional modeling device may further include a linear drive unit relatively changing a distance between the table and the processing section. The control unit may control the linear drive unit to perform a separation operation of increasing the distance from the table to the processing section along the rotary axis. On the table, the powder material is laminated while being processed. As a result, the height of the model increases. In this configuration, the distance from the powder material that requires processing to the modeling section can be kept constant. Accordingly, it is possible to easily control the modeling section.

The control unit of the three-dimensional modeling device may perform the rotation operation, the supply operation, the modeling operation, and the separation operation in parallel. With this configuration, it is possible to shorten the modeling time required for modeling the spirally laminated model.

The control unit of the three-dimensional modeling device may perform the separation operation after performing the rotation operation, the supply operation, and the modeling operation in parallel. With this configuration, it is possible to shorten the modeling time required for modeling the model configured by a plurality of disk-shaped layers.

First Embodiment

The three-dimensional laminated model manufacturing device illustrated in FIG. 1 is a so-called 3D printer manufacturing a model 101S from a powder material 101. In the following description, the three-dimensional laminated model manufacturing device will be simply referred to as "three-dimensional modeling device 1". The powder material 101 is metal powder. The powder material 101 is, for example, titanium-based metal powder, inconel powder, aluminum powder, or the like. The powder material 101 is not limited to the metal powder. The powder material 101 may also be powder containing carbon fiber and resin, examples of which include carbon fiber reinforced plastics (CFRP). The powder material 101 may also be another type of powder that has conductivity. It should be noted that the powder material that is used in the three-dimensional modeling device 1 of the present disclosure is not limited to the conductive powder material. The powder material may not be conductive in a case where, for example, laser is used as an energy beam.

The three-dimensional modeling device 1 applies energy to the powder material 101. In other words, the three-dimensional modeling device 1 raises the temperature of the powder material 101. As a result, the powder material 101 is melted or sintered. Then, the temperature of the powder material 101 falls when the three-dimensional modeling device 1 stops applying energy. As a result, the powder material 101 solidifies. In other words, the three-dimensional modeling device 1 manufactures the model 101S by repeatedly applying energy and stopping applying energy a plurality of times. The model 101S is, for example, a mechanical component. It should be noted that the model 101S may also be another structure.

The three-dimensional modeling device 1 has a drive unit 3, a control unit 4, a processing section 6, and a housing 8. The drive unit 3 realizes various operations required for the modeling. The processing section 6 processes the powder material 101. The model 101S is obtained as a result of this processing. Specifically, the processing of the powder material 101 includes the supply processing of the powder material 101, the preheating processing of the powder material 101, and the modeling processing of the powder material 101. The housing 8 is supported by a plurality of columns 7. The housing 8 forms a modeling space S. The modeling space S accommodates the powder material 101. The modeling space S is a space for performing the processing of the powder material 101 by the processing section 6. The modeling space S is an airtight space that can be decompressed.

A table 13 and a modeling tank 14 are disposed in the modeling space S. The table 13 is a processing table where the modeling processing is performed. The table 13 has, for example, a disk shape. The powder material 101, which is a raw material of the model 101S, is disposed on the table 13. The central axis of the table 13 overlaps the central axis of the housing 8. The drive unit 3 is connected to the table 13. The drive unit 3 causes the table 13 to rotate and linearly move along a rotary axis.

The drive unit 3 causes the table 13 to rotate, ascend, and descend. The drive unit 3 has a rotation unit 15 (rotation drive unit) and a lifting-lowering unit 16 (linear drive unit). The rotation unit 15 rotates the table 13. The rotation unit 15 includes a drive source (such as a motor). The upper end of the lifting-lowering unit 16 is connected to the table 13. The lifting-lowering unit 16 lifts and lowers the table 13 relative to the modeling tank 14. The lifting and lowering are along the rotary axis of the rotation unit 15. It should be noted that the drive unit 3 may be a mechanism capable of rotating, lifting, and lowering the table 13. The drive unit 3 is not limited to the above mechanism.

Figure 2:
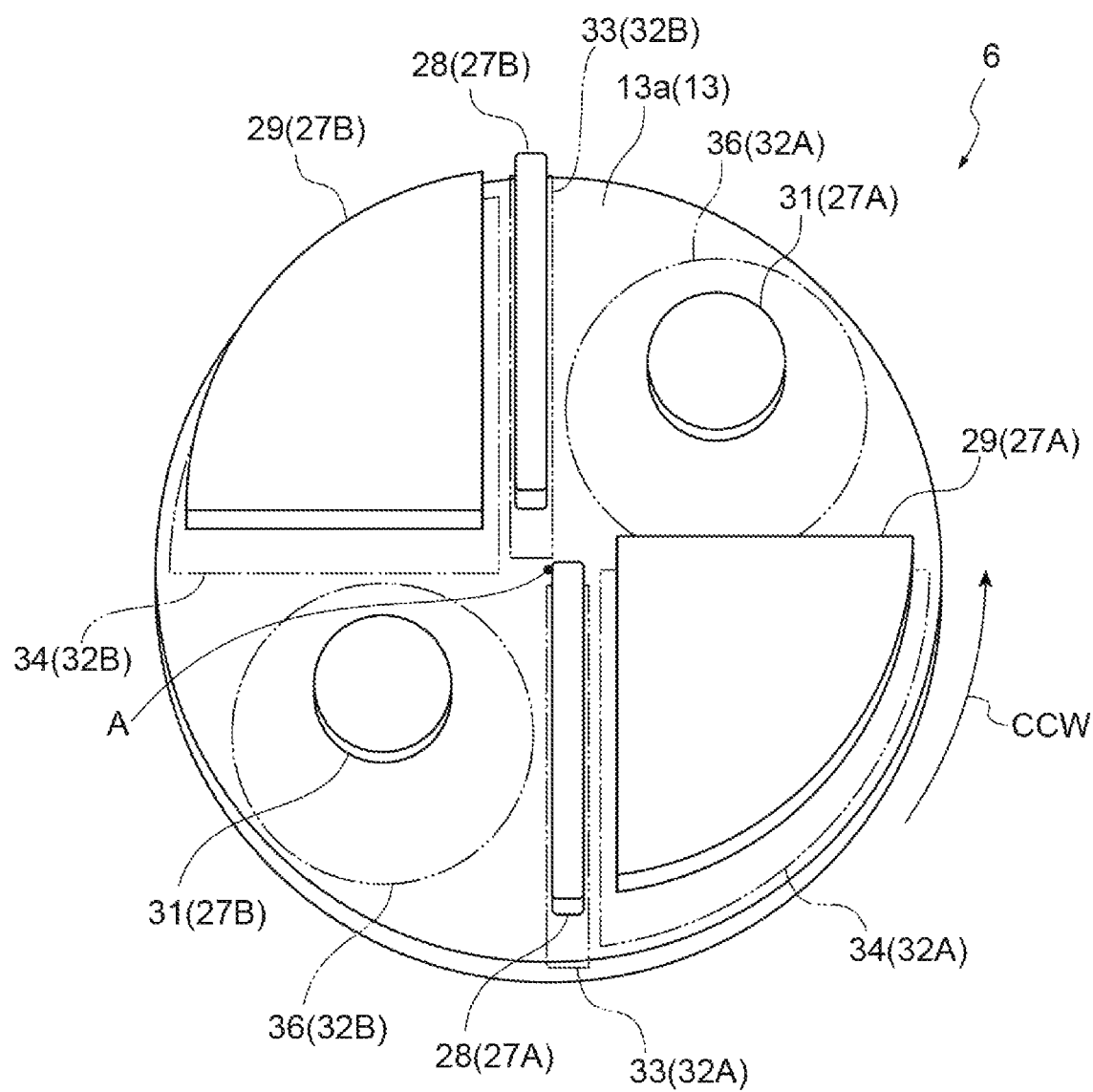
FIG. 2 is a diagram illustrating a processing section of the three-dimensional modeling device of FIG. 1.

FIG. 2 is an enlarged view of the main components that are used in the modeling processing. The processing section 6 is disposed above the table 13. In other words, the processing section 6 faces a modeling surface 13a (main surface) of the table 13. The processing section 6 includes processing units 27A and 27B as a plurality of processing units. The processing units 27A and 27B are disposed at equal intervals (180 degrees) around a rotary axis A. In other words, the processing units 27A and 27B are, for example, equally disposed in a circumferential direction. With this disposition, it is possible to align the lamination thickness of the powder material 101 in accordance with the rotation angle to the next processing region. It should be noted that the disposition of the processing units 27A and 27B described above is an example. The disposition of the processing units 27A and 27B is not limited to the configuration. For example, the processing units 27A and 27B may be disposed at different angles in the circumferential direction.

For example, when an XY coordinate system having the rotary axis A as an origin is defined, the processing unit 27A is disposed in the first quadrant and the fourth quadrant. The processing unit 27B is disposed in the second quadrant and the third quadrant. In other words, in a case where the processing units 27A and 27B are equally disposed in the circumferential direction, the processing units 27A and 27B are disposed point-symmetrically with respect to the Y axis. It should be noted that the processing units 27A and 27B may not be point-symmetrically disposed in a case where the processing units 27A and 27B are not equally disposed.

The processing units 27A and 27B are disposed at different positions. The specific constituent elements of the processing units 27A and 27B are common. It should be noted that the constituent elements of the processing units 27A and 27B may be different from each other. For example, some of the constituent elements of one of the processing units 27A and 27B may be omitted in the other. Hereinafter, the processing unit 27A will be described in detail. Regarding the processing unit 27B, description will be added if necessary.

The processing unit 27A includes a feeder 28 (material supply unit), a heater 29, and a beam source 31 (first beam providing unit). The feeder 28 performs the supply processing of the powder material 101. The heater 29 performs the preheating processing of the powder material 101. The beam source 31 performs the modeling processing of the powder material 101.

The feeder 28 supplies the powder material 101 to the table 13. The feeder 28 has a raw material tank (not illustrated) and a leveling unit (not illustrated). The raw material tank stores the powder material 101. In addition, the raw material tank supplies the powder material 101 to the table 13. The leveling unit levels the surface of the powder material 101 supplied to the table 13. It should be noted that the three-dimensional modeling device 1 may have a roller unit, a rod-shaped member, a brush unit, or the like instead of the leveling unit.

The heater 29 raises the temperature of the powder material 101 with radiant heat. An infrared heater or the like may be used as the heater 29. A gas heater or the like may also be used as the heater 29.

The beam source 31 generates an electron beam. The powder material 101 is irradiated with the electron beam. The beam source 31 is, for example, an electron gun. The electron gun generates the electron beam in accordance with the potential difference that is generated between a cathode and an anode.

The feeder 28, the heater 29, and the beam source 31 are disposed in this order along the direction of rotation of the table 13. The table 13 rotates counterclockwise. In the following description, "upstream" and "downstream" are with respect to the direction of rotation of the table 13. For example, when the XY coordinate system having the rotary axis A as the origin is defined, the feeder 28 and the heater 29 of the processing unit 27A are disposed in the fourth quadrant. The beam source 31 is disposed in the first quadrant. The feeder 28 and the heater 29 of the processing unit 27B are disposed in the second quadrant. The beam source 31 (second beam providing unit) is disposed in the third quadrant.

The feeder 28, the heater 29, and the beam source 31 form processing regions 32A and 32B on the modeling surface 13a. The processing regions 32A and 32B revolve relative to the table 13. In other words, the three-dimensional modeling device 1 has a plurality of processing regions. Here, "revolve relative to the table 13" means that the positions of the processing regions 32A and 32B do not change with respect to the rotation of the table 13. In other words, when the table 13 and the processing regions 32A and 32B are defined by a certain coordinate system, the table 13 rotates with respect to the coordinate system. However, the processing regions 32A and 32B do not move with respect to the coordinate system.

The processing region 32A includes a supply region 33, a preheating region 34, and a modeling region 36. The feeder 28 forms the supply region 33. The heater 29 forms the preheating region 34. The beam source 31 forms the modeling region 36. The positional relationship of the supply region 33, the preheating region 34, and the modeling region 36 corresponds to the positional relationship of the feeder 28, the heater 29, and the beam source 31. When the XY coordinate system having the rotary axis A as the origin is defined, the supply region 33 and the preheating region 34 of the processing unit 27A are disposed in the fourth quadrant. The modeling region 36 is disposed in the first quadrant. The supply region 33 and the preheating region 34 of the processing unit 27B are disposed in the second quadrant. The modeling region 36 is disposed in the third quadrant.

It should be noted that the supply region 33, the preheating region 34, and the modeling region 36 may be formed in this order along the direction of rotation. Accordingly, in the first quadrant and the fourth quadrant where the processing unit 27A is disposed, the region occupied by the supply region 33, the region occupied by the preheating region 34, and the region occupied by the modeling region 36 may be appropriately changed. For example, the preheating region 34 may be set from the fourth quadrant to the first quadrant and the modeling region 36 may be set in the first quadrant. The preheating region 34 may be set in the fourth quadrant and the modeling region 36 may be set from the fourth quadrant to the first quadrant.

The table 13 rotates in a counterclockwise direction CCW. When a certain point is assumed in the table 13, the point passes through the supply region 33, the preheating region 34, and the modeling region 36 in this order as the table 13 rotates.

The supply region 33 is formed below the feeder 28. The shape of the supply region 33 is, for example, a rectangular shape having the diameter direction (radial direction) of the table 13 as a longitudinal direction. It should be noted that the shape of the supply region 33 is not limited to the rectangular shape. Depending on the configuration of the feeder 28 or the like, various shapes may be adopted as the shape of the supply region 33. For example, the shape of the supply region 33 may be a square, a polygon, a circle, an ellipse, or the like. In addition, for example, the supply region 33 reaches the circumferential edge of the table 13 from the center of the table 13. The shape of the supply region 33 does not have to match the shape of the feeder 28 in a plan view. The shape of the supply region 33 may be appropriately set in accordance with the constituent components of the feeder 28. In the supply region 33, the powder material 101 is supplied from the feeder 28 to the table 13. The supplied powder material 101 is leveled so as to have a predetermined thickness. The supply region 33 may mean only the region where the powder material 101 is supplied. The supply region 33 may mean only the region where the powder material 101 is leveled. Further, the supply region 33 may include the region where the powder material 101 is supplied and the region where the powder material 101 is leveled.

The preheating region 34 is formed on the downstream side of the supply region 33. The preheating region 34 has a fan shape. Specifically, a top portion is disposed in the vicinity of the rotary axis A of the table 13. A circular arc portion is disposed along the outer peripheral edge of the table 13. The central angle of the preheating region 34 is, for example, 90 degrees. The radius of the preheating region 34 is substantially equal to the longitudinal length of the supply region 33. It should be noted that the radius of the preheating region 34 may be longer than the longitudinal length of the supply region 33. It should be noted that the shape of the preheating region 34 is not limited to the fan shape. Another shape may be adopted as the shape of the preheating region 34. For example, the preheating region 34 may be circular.

The temperature of the powder material 101 is raised in the preheating region 34. Here, the preheating is heating processing performed such that the temperature of the powder material 101 in the preheating region 34 becomes higher than the temperature of the powder material 101 in the supply region 33. Such heating processing may be, for example, the processing of temporarily sintering the powder material 101. The temporary sintering is a state where the powder materials 101 are diffused at the minimum point by a diffusion phenomenon and joined. The temperature of the powder material 101 is, for example, ½ or more of the melting point of the powder material 101. This is because the diffusion phenomenon of the sintering becomes active when the temperature of the powder material 101 is ½ or more of the melting point of the powder material 101. For example, in a case where the powder material 101 is titanium, the melting point of the titanium alloy is approximately 1,500° C. or more and 1,600° C. or less. Accordingly, the temporary sintering temperature is 700° C. or more and 800° C. or less. In addition, in a case where the powder material 101 is aluminum, the melting point of the aluminum is approximately 660° C. Accordingly, the temporary sintering temperature is 300° C.

The modeling region 36 is formed on the downstream side of the preheating region 34. The modeling region 36 is circular. The shape of the modeling region 36 matches the irradiation range (irradiable range) of the beam source 31. The temperature of the powder material 101 is raised in the modeling region 36. The temperature of the powder material 101 in the modeling region 36 is higher than the temperature of the powder material 101 in the preheating region 34. The temperature of the powder material 101 in the modeling region 36 is a temperature at which the model 101S can be formed. The temperature at which the model 101S can be formed is a sintering temperature or a melting temperature. The beam source 31 irradiates a desired part in the modeling region 36 such that the part is scanned with the electron beam. It should be noted that the shape of the modeling region may not match the shape of the irradiable range of the beam source. For example, the modeling region may be the desired part scanned with the beam whereas the irradiable range of the beam source is circular. In other words, the modeling region may be a region having a desired shape and included in the irradiable range.

Hereinafter, the operations of the three-dimensional modeling device 1 will be described in detail with reference to FIG. 3. The operations of the three-dimensional modeling device 1 include a first supply operation, a second supply operation, a first preheating operation, a second preheating operation, a first modeling operation, a second modeling operation, a rotation operation, and a lowering operation.

Figure 3A:
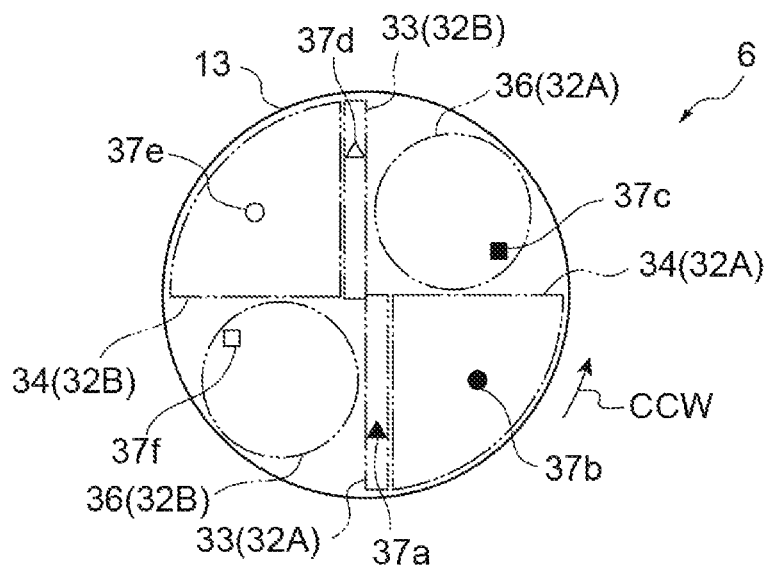
FIGS. 3A-3C are schematic diagrams for describing the operation of the three-dimensional modeling device.
Figure 3B:
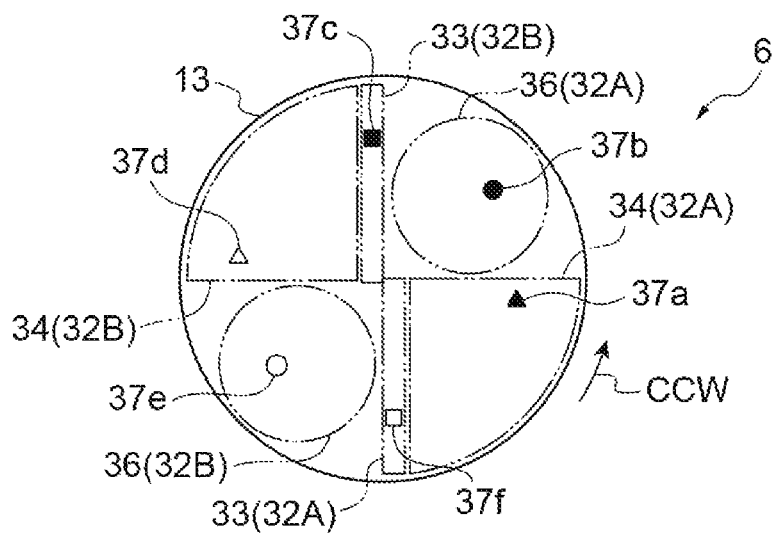
Figure 3C:
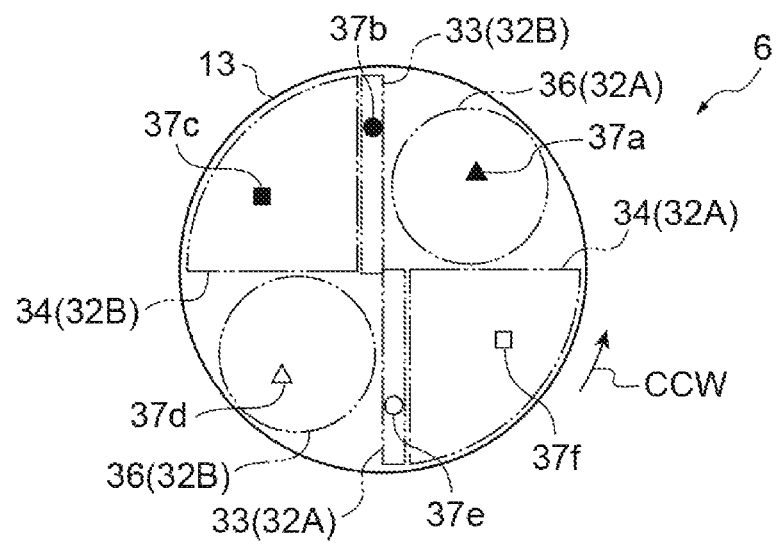

In FIGS. 3A-3C, the processing section 6 is fixed. In other words, the processing regions 32A and 32B are fixed. The processing regions 32A and 32B do not rotate. Meanwhile, the table 13 rotates in the counterclockwise direction CCW. For convenience of description, several regions are set in the table 13. The several regions include a first region 37a, a second region 37b, a third region 37c, a fourth region 37d, a fifth region 37e, and a sixth region 37f These regions are indicated by dots in FIGS. 3A-3C.

The control unit 4 controls the rotation unit 15. As a result, the table 13 rotates at a constant rotation speed in the counterclockwise direction CCW. This rotation speed may be determined based on how much the temperature rises in the preheating region 34 and how much the temperature rises in the modeling region 36. For example, the amount of energy is obtained that is necessary to raise the pre-preheating temperature of the powder material 101 to a predetermined temperature after the preheating. Next, the time required to apply that amount of energy to the powder material 101 is determined. Then, the rotation speed can be obtained from the required time and the length of the trajectory of passage at a time of passage through the preheating region 34.

The control unit 4 controls the lifting-lowering unit 16. As a result, the table 13 continuously moves downward with time. This operation is referred to as a separation operation. The speed of movement of the table 13 may be determined by the thickness of the layer that is formed each time the table 13 rotates once.

In the first state that is illustrated in FIG. 3A, the first region 37a undergoes the first supply operation in the supply region 33. The second region 37b undergoes the first preheating operation in the preheating region 34. The third region 37c undergoes the first modeling operation in the modeling region 36. The fourth region 37d undergoes the second supply operation in the supply region 33. The fifth region 37e undergoes the second preheating operation in the preheating region 34. The sixth region 37f undergoes the second modeling operation in the modeling region 36.

In the first state, the processing unit 27A performs the first preheating operation with respect to the second region 37b in parallel with the first supply operation with respect to the first region 37a. In addition, in the first state, the processing unit 27A performs the first modeling operation with respect to the third region 37c in parallel with the first supply operation with respect to the first region 37a. Further, the processing unit 27B performs the second preheating operation with respect to the fifth region 37e in parallel with the second supply operation with respect to the fourth region 37d. In addition, the processing unit 27B performs the second modeling operation with respect to the sixth region 37f in parallel with the second supply operation with respect to the fourth region 37d.

The table 13 rotates by a predetermined angle with time. The rotation results in the second state that is illustrated in FIG. 3B. In the second state, the first region 37a undergoes the first preheating operation in the preheating region 34. The second region 37b undergoes the first modeling operation in the modeling region 36. The third region 37c undergoes the second supply operation in the supply region 33. The fourth region 37d undergoes the second preheating operation in the preheating region 34. The fifth region 37e undergoes the second modeling operation in the modeling region 36. The sixth region 37f undergoes the first supply operation in the supply region 33.

In the second state, the processing unit 27A performs the first modeling operation with respect to the second region 37b in parallel with the first preheating operation with respect to the first region 37a. In addition, the processing unit 27A performs the first supply operation with respect to the sixth region 37f in parallel with the first preheating operation with respect to the first region 37a. Further, the processing unit 27B performs the second modeling operation with respect to the fifth region 37e in parallel with the second preheating operation with respect to the fourth region 37d. The processing unit 27B performs the second supply operation with respect to the first region 37a in parallel with the second preheating operation with respect to the fourth region 37d.

The table 13 rotates by a predetermined angle with further passage of time. The rotation results in the third state that is illustrated in FIG. 3C. In the third state, the first region 37a undergoes the first modeling operation in the modeling region 36. The second region 37b undergoes the second supply operation in the supply region 33. The third region 37c undergoes the second preheating operation in the preheating region 34. The fourth region 37d undergoes the second modeling operation in the modeling region 36. The fifth region 37e undergoes the first supply operation in the supply region 33. The sixth region 37f undergoes the first preheating operation in the preheating region 34.

In the third state, the processing unit 27A performs the first supply operation with respect to the fifth region 37e in parallel with the first modeling operation with respect to the first region 37a. The processing unit 27A performs the first preheating operation with respect to the sixth region 37f in parallel with the first modeling operation with respect to the first region 37a. Further, the processing unit 27B performs the second supply operation with respect to the second region 37b in parallel with the second modeling operation with respect to the fourth region 37d. The processing unit 27B performs the second preheating operation with respect to the third region 37c in parallel with the second modeling operation with respect to the fourth region 37d.

Hereinafter, the actions and effects of the three-dimensional modeling device 1 will be described.

The processing units 27A and 27B of the three-dimensional modeling device 1 spread the powder material 101 on the table 13, preheat the powder material 101, and irradiate the powder material 101 with the electron beam. The plurality of processing units 27A and 27B performing these operations are disposed around the rotary axis A. As a result, the supply operation by the processing unit 27A and the supply operation by the processing unit 27B can be performed in parallel. Likewise, the preheating operation by the processing unit 27A and the preheating operation by the processing unit 27B can be performed in parallel. Further, the modeling operation by the processing unit 27A and the modeling operation by the processing unit 27B can be performed in parallel. Accordingly, the modeling time can be further shortened.

Further actions and effects of the three-dimensional modeling device 1 will be described.

The three-dimensional modeling device 1 performs the supply operation, the preheating operation, and the modeling operation for modeling the model 101S in different regions. As a result, each operation can be executed in parallel. Accordingly, the modeling time can be shortened as compared with a case where the model 101S is modeled by each operation being sequentially performed.

The three-dimensional modeling device 1 further has the processing section 6 and the control unit 4 controlling the rotation unit 15. The control unit 4 controls the rotation unit 15 to perform the rotation operation of rotating the table 13 with respect to the processing section 6. The control unit 4 controls the two feeders 28 to perform the supply operation of supplying the powder material 101 to the two supply regions 33. Further, the control unit 4 controls the two beam sources 31 to perform the modeling operation of irradiating the two modeling regions 36 with the electron beam. With this configuration, it is possible to preferably shorten the modeling time.

The three-dimensional modeling device 1 further has the lifting-lowering unit 16 relatively changing the distance between the table 13 and the processing section 6. The control unit 4 controls the lifting-lowering unit 16 to perform the lowering operation of increasing the distance from the table 13 to the processing section 6 along the rotary axis A. On the modeling surface 13a, the powder material 101 is laminated while being processed. As a result, the height of the model 101S increases. In this configuration, the distance from the powder material 101 that requires processing to the processing section 6 can be kept constant. Accordingly, the control of the processing section 6 can be facilitated.

The preheating region 34 revolving relative to the table 13 around the rotary axis A and set on the downstream side with respect to the feeder 28 and on the upstream side of the beam source 31 is formed on the modeling surface 13a of the three-dimensional modeling device 1. The processing section 6 further has the heater 29 heating the powder material 101 that is present in the preheating region 34.

The control unit 4 of the three-dimensional modeling device 1 performs the supply operation, the preheating operation, the modeling operation, the rotation operation, and the lowering operation in parallel. In this control mode, it is possible to shorten the modeling time required for modeling the spirally laminated model 101S. In other words, the three-dimensional modeling device 1 is capable of shortening the tact time.

Here, the shortening of the modeling time will be described with exemplification of the time required for each operation. For example, the time required to model one layer of the model 101S is assumed. The supply operation is t1. The preheating operation is t2. The modeling operation is t3. The lowering operation is t5. The magnitude relationship of the times is t1≅t5<t2≅t3. Here, in a case where each operation is sequentially performed, the time required to model one layer of the model 101S is the sum of the times. In other words, the modeling time is t1+t2+t3+t5. Meanwhile, the modeling time is t2 or t3 when each operation is performed in parallel as in the three-dimensional modeling device 1. In other words, the modeling time is determined by the most time-consuming operation in a case where the operations are performed in parallel. Accordingly, the modeling time can be shortened as compared with the case where each operation is sequentially performed. The time-saving effect is especially high in a case where two or more time-consuming operations are included. Examples of the time-consuming operations include the preheating operation and the modeling operation.

Further, energy loss can be reduced by means of the parallel processing. For example, when each operation is sequentially performed, the irradiation with the electron beam is not performed during the execution of the supply operation and the execution of the lowering operation. In other words, the heating processing is not performed during the execution of the supply operation and the execution of the lowering operation. In other words, an operation entailing heating and an operation entailing no heating are repeated on the table 13. As a result, the temperature environment of the modeling surface 13a changes in the event of, for example, switching from the operation entailing heating to the operation entailing no heating. Specifically, the temperature of the modeling surface 13a decreases. Then, energy is required, for the temperature to be raised by the amount of decrease, in the event of re-switching to the operation entailing heating.

Meanwhile, in the parallel processing, the preheating operation is performed at all times in the preheating region 34. In other words, the heating processing by means of the heater is performed. Accordingly, heating and non-heating are not repeated in the preheating region 34. As a result, the temperature drop that occurs during non-heating is also suppressed. Then, the energy for raising the temperature by the amount of decrease is unnecessary, and thus energy loss can be reduced. The same applies to the modeling region 36.

In the three-dimensional modeling device 1, the modeling surface 13a moves with respect to the fixed heater 29 and beam source 31. Accordingly, there is no need to prepare the heater 29 and the beam source 31 that are large in scale and whose irradiation ranges are the entire surface of the modeling surface 13a. Then, it is possible to reduce the number of expensive electron guns required for the heater 29 and the beam source 31. As a result, cost reduction is also achievable.

Second Embodiment

Figure 4:
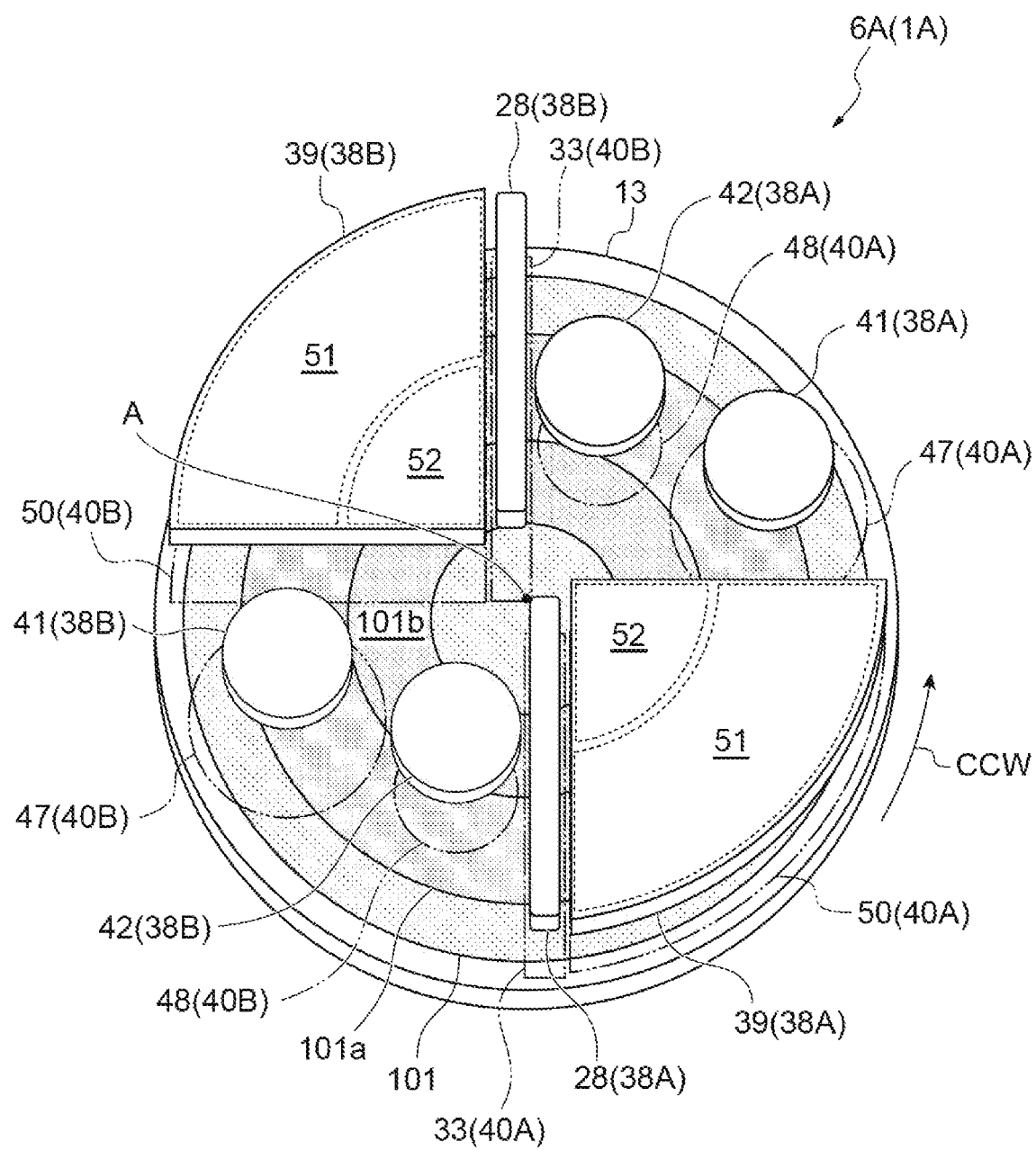
FIG. 4 is a diagram illustrating a processing section of a three-dimensional modeling device according to a second embodiment.
Figure 5:
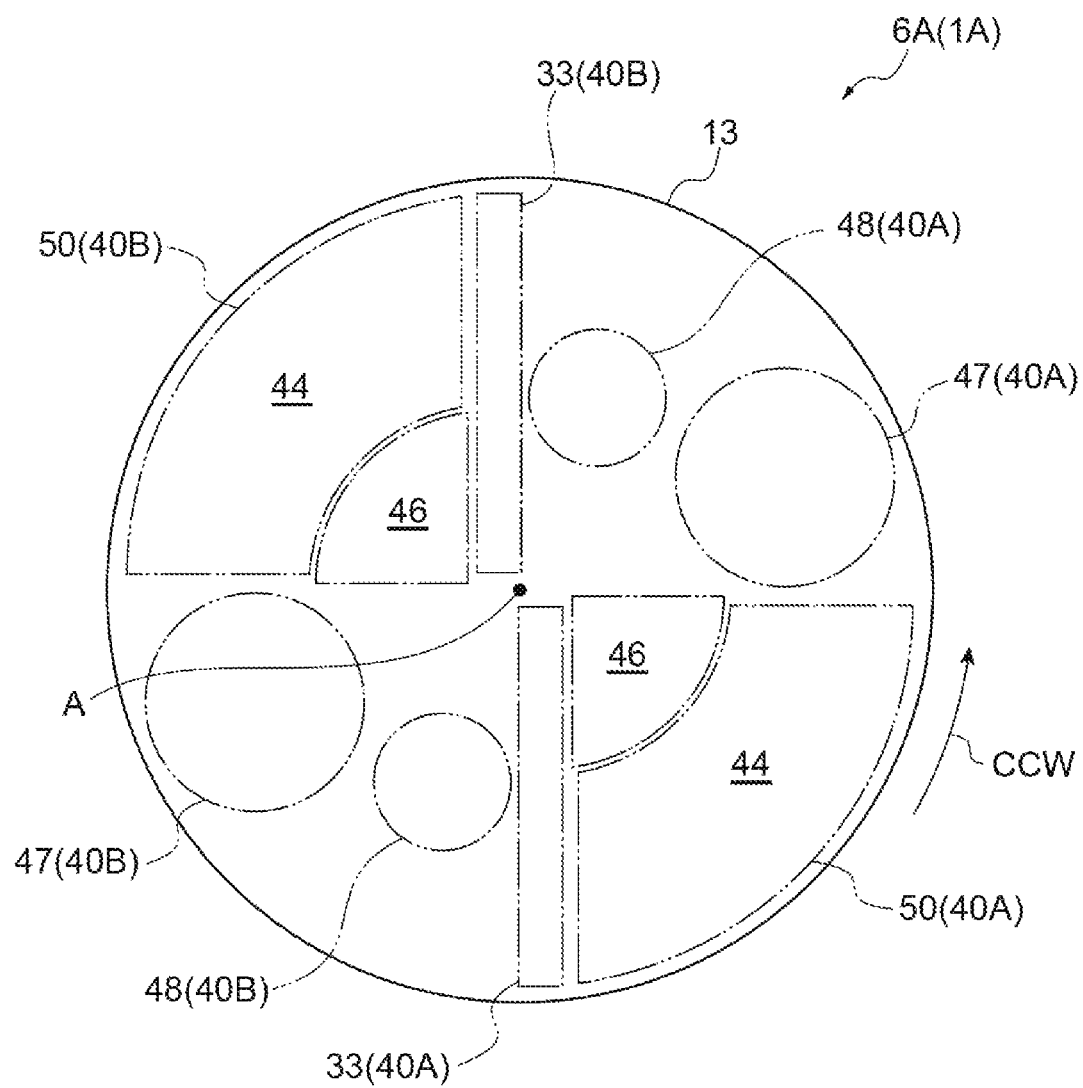
FIG. 5 is a diagram illustrating a processing region in the three-dimensional modeling device of FIG. 4.

A three-dimensional modeling device 1A of a second embodiment will be described with reference to FIGS. 4 and 5. The three-dimensional modeling device 1A of the second embodiment has a processing section 6A. The processing section 6A has processing units 38A and 38B. The positions of the processing units 38A and 38B with respect to the table 13 are the same as the positions of the processing units 27A and 27B of the first embodiment. Hereinafter, the configuration of the processing unit 38A will be described in detail with the description of the processing unit 38B that is common to the processing units 38A and 38B omitted.

In the following description, "outer periphery-side region" refers to the outside region at a time when the powder material 101 that is spread in a circular shape or a circular ring shape in a plan view is radially divided. In addition, "inner periphery-side region" refers to the inside region at the time when the powder material 101 that is spread in the circular shape or the circular ring shape in the plan view is radially divided. Further, the outer periphery-side region will be referred to as an outer peripheral region 101a. The inner periphery-side region will be referred to as an inner peripheral region 101b. For example, the outer peripheral region 101a has a circular ring shape and surrounds the inner peripheral region 101b. For example, the inner peripheral edge of the outer peripheral region 101a is in contact with the outer peripheral edge of the inner peripheral region 101b. It should be noted that the outer peripheral region 101a and the inner peripheral region 101b may partially overlap, in addition to the mutual contact, as for the relationship between the outer peripheral region 101a and the inner peripheral region 101b. Also, the outer peripheral region 101a and the inner peripheral region 101b may not overlap each other. In addition, although three aspects of the relationship between the outer peripheral region 101a and the inner peripheral region 101b are exemplified as described above, these aspects may be different for each powder layer. For example, the outer peripheral region 101a and the inner peripheral region 101b may be in contact with each other in one powder layer with the outer peripheral region 101a and the inner peripheral region 101b partially overlapping in another powder layer. In addition, the relationship between the outer peripheral region 101a and the inner peripheral region 101b may be appropriately set in accordance with the shape of the model. Further, the outer peripheral edge of the outer peripheral region 101a may be in common with the outer peripheral edge of the powder material 101. The outer peripheral edge of the outer peripheral region 101a may be formed inside the outer peripheral edge of the powder material 101. The inner peripheral region 101b has a circular ring or circular shape and is surrounded by the outer peripheral region 101a.

The processing units 38A and 38B have the feeder 28, a heater 39, an outside beam source 41, and an inside beam source 42. The processing unit 38A constitutes a processing region 40A illustrated in FIG. 5. In addition, the processing unit 38B constitutes a processing region 40B illustrated in FIG. 5. The processing regions 40A and 40B include the supply region 33, an outer peripheral preheating region 44, an inner peripheral preheating region 46, an outer peripheral modeling region 47, and an inner peripheral modeling region 48.

The heater 39 forms the outer peripheral preheating region 44 and the inner peripheral preheating region 46. The region that includes the outer peripheral preheating region 44 and the inner peripheral preheating region 46 will be referred to as a comprehensive preheating region 50. The shape of the comprehensive preheating region 50 of the heater 39 is different from the shape of the preheating region 34 of the heater 29 of the first embodiment. The comprehensive preheating region 50 that is formed in the fourth quadrant has a fan shape. As an example, the central angle of the comprehensive preheating region 50 may be 90 degrees, larger than 90 degrees, or smaller than 90 degrees. For example, the central angle of the comprehensive preheating region 50 may be 90 degrees. More specifically, the heater 39 includes a first preheating unit 51 and a second preheating unit 52. The first preheating unit 51 forms the outer peripheral preheating region 44. The second preheating unit 52 forms the inner peripheral preheating region 46.

The outside beam source 41 forms the outer peripheral modeling region 47. The outside beam source 41 provides an electron beam with respect to the powder material 101 that is positioned on the outer peripheral side of the table 13. In addition, the inside beam source 42 forms the inner peripheral modeling region 48. The inside beam source 42 provides an electron beam with respect to the powder material 101 that is positioned on the inner peripheral side of the table 13.

The outside beam source 41 is disposed closer to the outer peripheral side than the inside beam source 42. For example, the distance from the rotary axis A to the outside beam source 41 is longer than the distance from the rotary axis A to the inside beam source 42. In other words, the distance from the rotary axis A to the inside beam source 42 is shorter than the distance from the rotary axis A to the outside beam source 41. Further, the outside beam source 41 is disposed upstream of the inside beam source 42. In other words, in the circumferential direction, the distance from the outer peripheral preheating region 44 to the outside beam source 41 is shorter than the distance from the inner peripheral preheating region 46 to the inside beam source 42. For example, the outside beam source 41 may be disposed in the fourth quadrant. The inside beam source 42 may be disposed in the first quadrant.

The irradiable range of the electron beam in the outside beam source 41 is the outer peripheral modeling region 47. The outside beam source 41 irradiates a desired part in the outer peripheral modeling region 47 such that the part is scanned with the electron beam. Likewise, the irradiable range of the electron beam in the inside beam source 42 is the inner peripheral modeling region 48. The inside beam source 42 irradiates a desired part in the inner peripheral modeling region 48 such that the part is scanned with the electron beam.

The area of the outer peripheral modeling region 47 may be larger than, equal to, or smaller than the area of the inner peripheral modeling region 48. In addition, the shape of the outer peripheral modeling region 47 may be a circle or another shape. Further, various aspects can be taken as to the relationship between the outer peripheral modeling region 47 and the inner peripheral modeling region 48. In other words, the outer peripheral modeling region 47 and the inner peripheral modeling region 48 may be in contact with each other, may partially overlap, or may not overlap as for the relationship between the outer peripheral modeling region 47 and the inner peripheral modeling region 48.

For example, the outer peripheral modeling region 47 may not overlap the inner peripheral modeling region 48. In this configuration, the outside beam source 41 is disposed upstream of the inside beam source 42 as described above. Accordingly, the outer peripheral modeling region 47 does not overlap the inner peripheral modeling region 48. As a result, it is possible to prevent mutual interference between the electron beam of the outside beam source 41 and the electron beam of the inside beam source 42. Accordingly, the control of the outside beam source 41 and the inside beam source 42 can be simplified.

When a virtual reference circle is set about the rotary axis A, the outer peripheral preheating region 44 and the outer peripheral modeling region 47 are set on a common reference circle. As a result, the powder material 101 that has passed through the outer peripheral preheating region 44 is provided to the outer peripheral modeling region 47. Likewise, the inner peripheral preheating region 46 and the inner peripheral modeling region 48 are also set on a common reference circle. The powder material 101 that has passed through the inner peripheral preheating region 46 is provided to the inner peripheral modeling region 48.

The processing units 38A and 38B of the three-dimensional modeling device 1A described above include the outside beam source 41 and the inside beam source 42 providing the electron beams. The distance from the rotary axis A to the inside beam source 42 is shorter than the distance from the rotary axis A to the outside beam source 41. With this configuration, it is possible to divide the model 101S into outer and inner peripheral parts with respect to the rotary axis A in modeling the model 101S.

The outside beam source 41 of the three-dimensional modeling device 1A described above is disposed upstream of the inside beam source 42 along the direction of rotation that is provided by the drive unit 3. In this configuration, the outer peripheral side part of the model 101S is modeled first. In other words, the temperature of the outer peripheral part rises before the temperature of the inner peripheral part rises. As a result, the temperature of the outer peripheral part is kept high for a long time. As a result, a decrease in the temperature of the model 101S is suppressed with ease.

The processing units 38A and 38B of the three-dimensional modeling device 1A described above have the first preheating unit 51 and the second preheating unit 52 preheating the powder material 101. The processing units 38A and 38B are disposed in the order of the first preheating unit 51 and the outside beam source 41 along the direction of rotation that is provided by the drive unit 3. The second preheating unit 52 and the inside beam source 42 are disposed in this order along the direction of rotation that is provided by the drive unit 3. In this configuration, the powder material 101 that is provided to the outside beam source 41 can be reliably preheated by the first preheating unit 51. Likewise, the powder material 101 that is provided to the inside beam source 42 can be reliably preheated by the second preheating unit 52.

Third Embodiment

A three-dimensional modeling device 1B of a third embodiment will be described with reference to FIGS. 6 and 7. The three-dimensional modeling device 1B of the third embodiment has a processing section 6B. The processing section 6B includes processing units 49A and 49B. Hereinafter, the configuration of the processing unit 49A will be described in detail. The description of the processing unit 49B that is common to the processing units 49A and 49B is omitted.

The processing unit 49A forms a processing region 53A. The processing unit 49B forms a processing region 53B. The processing unit 49A has the feeder 28, an upstream heater 54, a downstream heater 55, the outside beam source 41, and the inside beam source 42. In other words, the processing unit 49A of the third embodiment includes two heaters. The upstream heater 54 has the same configuration as the heater 39 of the second embodiment. The downstream heater 55 is disposed between the outside beam source 41 and the inside beam source 42 in the circumferential direction about the rotary axis A.

The upstream heater 54 has a first preheating unit 56 and a second preheating unit 57. The first preheating unit 56 forms an outer peripheral preheating region 58. The second preheating unit 57 forms an upstream inner peripheral preheating region 59. The outer peripheral preheating region 58 and the upstream inner peripheral preheating region 59 constitute an upstream heating region 60. The outer peripheral preheating region 58 has the same configuration as the outer peripheral preheating region 44 of the second embodiment. The upstream inner peripheral preheating region 59 has the same configuration as the inner peripheral preheating region 46 of the second embodiment.

The downstream heater 55 has a first postheating unit 61 and a third preheating unit 62. Here, "postheating" is used as a term paired with "preheating". Specifically, "preheating" means processing performed before the modeling processing by the beam source 31. "Postheating" means processing performed after the modeling processing by the beam source 31. Accordingly, the processing flow of the three-dimensional modeling device 1A is performed in the order of the supply processing, the preheating processing, the modeling processing, and the postheating processing.

The first postheating unit 61 forms an outer peripheral postheating region 63. The third preheating unit 62 forms a downstream inner peripheral preheating region 64. The outer peripheral postheating region 63 and the downstream inner peripheral preheating region 64 constitute a downstream heating region 66. The downstream heater 55 is disposed downstream of the outside beam source 41. Meanwhile, the downstream heater 55 is disposed upstream of the inside beam source 42. Then, the processing target of the downstream heater 55 includes a part that has been modeling-processed by the outside beam source 41 and a part that is yet to be modeling-processed by the inside beam source 42. The outer peripheral postheating region 63 heats the part modeling-processed by the outside beam source 41. The downstream inner peripheral preheating region 64 heats the part yet to be modeling-processed by the inside beam source 42.

The powder material 101 includes a part that passes through the outer peripheral preheating region 58, the outer peripheral modeling region 47, and the outer peripheral postheating region 63 in this order and a part that passes through the upstream inner peripheral preheating region 59, the downstream inner peripheral preheating region 64, and the inner peripheral modeling region 48 in this order.

The processing units 49A and 49B of the three-dimensional modeling device 1B described above have the downstream heater 55 heating the model 101S. The outside beam source 41 and the downstream heater 55 are disposed in this order along the direction of rotation that is provided by the drive unit 3. In this configuration, the temperature of the model 101S is maintained by the downstream heater 55. Accordingly, it is possible to suppress a decrease in the temperature of the powder material 101 that is new and further supplied from the processing unit 49B as well as the model 101S processed by the processing unit 49A.

Modification Examples

The three-dimensional modeling device of the present disclosure is not limited to the above embodiments. It is possible to appropriately change the shape, disposition, and so on of each constituent element without departing from the gist of the claims in implementing the three-dimensional modeling device of the present disclosure.

In the above-described embodiments, the operation of the three-dimensional modeling device has been described with an example in which a plurality of preheating units and a plurality of beam providing units are operated at the same time. For example, the plurality of preheating units and the plurality of beam providing units may be operated at the same time as described above or only the constituent element that is necessary may be operated depending on the shape of the model. The operation of the constituent element that is unnecessary may be stopped. In other words, those to be used among the plurality of preheating units and the plurality of beam providing units may be selected in accordance with the shape of the model or switching may be performed to a state where all are used.

For example, the preheating and melting in the outer peripheral region 101a and the preheating and melting in the inner peripheral region 101b do not necessarily have to be performed together with respect to the same powder layer depending on the shape of the model. Depending on the shape of the model, it is assumed that a region where the powder should be melted is present only in either the inner peripheral region or the outer peripheral region in a certain powder layer. The region where the powder should be melted is a cross section of the model. For example, a case is assumed where a tubular model that has parts different in outer diameter is modeled. A conical pedestal shape and the like can be exemplified as such a shape. In this case, at the part where the outer diameter of the model is large, a part to be modeled may be present in the outer peripheral region 101a without being present in the inner peripheral region 101b. Further, at the part where the outer diameter of the model is small, a part to be modeled may be present in the inner peripheral region 101b without being present in the outer peripheral region 101a. In a case where such a model is modeled, modeling in the outer peripheral region 101a may be performed, without modeling in the inner peripheral region 101b being performed, at the part where the outer diameter of the model is large. In other words, at the part where the outer diameter of the model is large, modeling in the outer peripheral region 101a may be performed with the operations of the second preheating unit 52 and the inside beam source 42 stopped. Further, at the part where the outer diameter of the model is small, modeling in the inner peripheral region 101b may be performed without modeling in the outer peripheral region 101a being performed. In other words, at the part where the outer diameter of the model is small, modeling in the inner peripheral region 101b may be performed and the operations of the first preheating unit 51 and the outside beam source 41 may be stopped.

Figure 8:
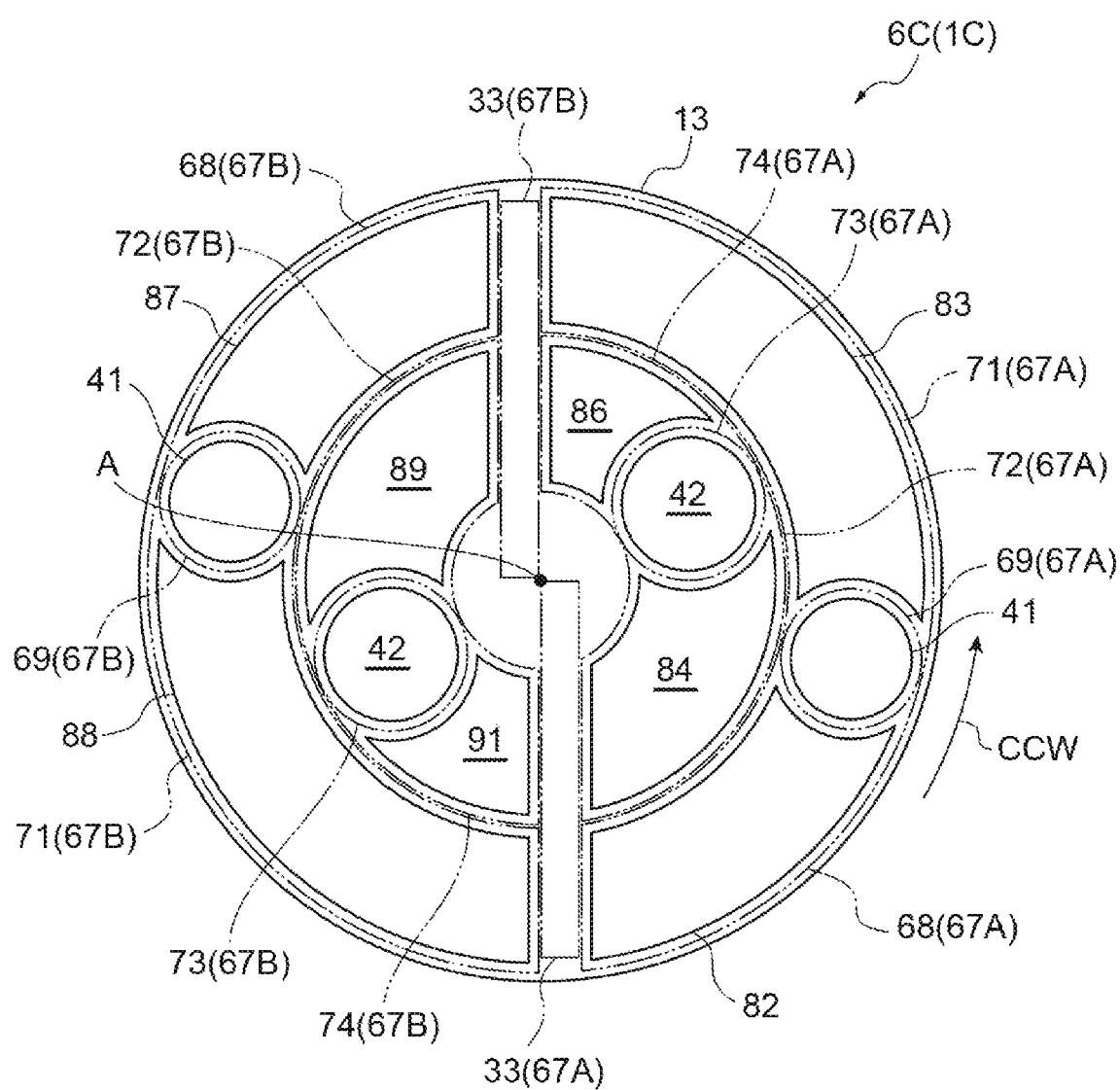
FIG. 8 is a diagram illustrating a processing region of a three-dimensional modeling device according to a modification example.

For example, a three-dimensional modeling device 1C of Modification Example 1 may have a processing section 6C as illustrated in FIG. 8. The processing section 6C forms processing regions 67A and 67B. The processing regions 67A and 67B include the supply region 33, an outer peripheral preheating region 68, an outer peripheral modeling region 69, and an outer peripheral postheating region 71 and may also include an inner peripheral preheating region 72, an inner peripheral modeling region 73, and an inner peripheral postheating region 74.

The configuration of the heater is not particularly limited in a case where the processing regions 67A and 67B are formed. For example, the outer peripheral preheating region 68, the outer peripheral postheating region 71, the inner peripheral preheating region 72, and the inner peripheral postheating region 74 may be formed by one heater capable of heating the entire surface of the table 13. In other words, the heating region that is provided by one heater may include two outer peripheral preheating regions 68, two outer peripheral postheating regions 71, two inner peripheral preheating regions 72, and two inner peripheral postheating regions 74.

Each region may be formed by a plurality of heaters as illustrated in FIG. 8. In other words, the outer peripheral preheating region 68 of the processing region 67A may be formed by a first heater 82. The outer peripheral postheating region 71 of the processing region 67A may be formed by a second heater 83. The inner peripheral preheating region 72 of the processing region 67A may be formed by a third heater 84. The inner peripheral postheating region 74 of the processing region 67A may be formed by a fourth heater 86. Likewise, the outer peripheral preheating region 68 of the processing region 67B may be formed by a fifth heater 87. The outer peripheral postheating region 71 of the processing region 67B may be formed by a sixth heater 88 (first postheating unit). The inner peripheral preheating region 72 of the processing region 67B may be formed by a seventh heater 89. The inner peripheral postheating region 74 of the processing region 67B may be formed by an eighth heater 91 (second postheating unit).

In this configuration, an example of the relationship of the temperature (T1) of the powder material 101 preheated by the first heater 82, the temperature (T2) of the powder material 101 heated by the outside beam source 41, and the temperature (T3) of the powder material 101 postheated by the second heater 83 is, for example, T2>T1=T3. In other words, the temperature (T1) of the powder material 101 in the outer peripheral preheating region 68 and the temperature (T3) of the model 101S in the outer peripheral postheating region 71 are equal to each other. Further, the temperatures of the powder material 101 and the model 101S in the outer peripheral modeling region 69 are higher than those temperatures (T1 and T3). Here, the temperature may be the target temperature of the first heater 82, the outside beam source 41, and the second heater 83. In addition, the temperature may be a temperature obtained by the powder material 10 being actually measured. Further, the temperature may be a temperature obtained by the model 101S being actually measured. With this configuration, it is possible to reduce the temperature difference between the temperature of the powder material 101 and the temperature of the model 101S.

The above temperature relationship is an example, and thus another configuration may also be used. For example, the preheating temperature (T1) and the postheating temperature (T3) may be different from each other (T2>T1≠T3). As an example, the preheating temperature (T1) may be higher than the postheating temperature (T3) (T2>T1>T3). On the contrary, the preheating temperature (T1) may be lower than the postheating temperature (T3) (T2>T3>T1). With this configuration, it is possible to set the temperature difference between the temperature of the powder material 101 and the temperature of the model 101S to a desired value.

The same temperature relationship applies to the inner peripheral side. In other words, the relationship of the temperature (T4) of the powder material 101 preheated by the third heater 84, the temperature (T5) of the powder material 101 heated by the inside beam source 42, and the temperature (T6) of the powder material 101 postheated by the fourth heater 86 may be, for example, T5>T4=T6, T5>T4>T6, or T5>T6>T4.

Figure 9:
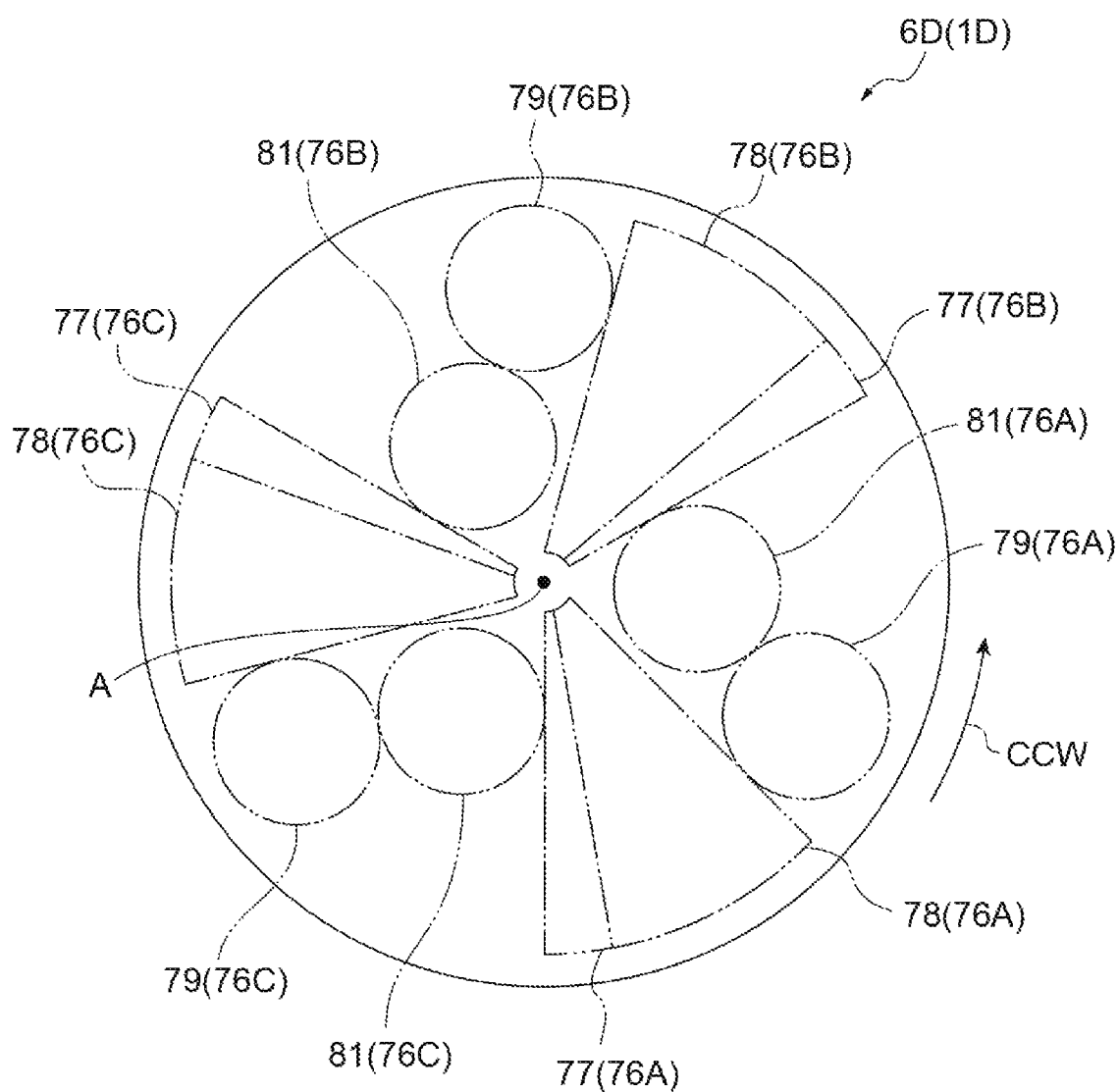
FIG. 9 is a diagram illustrating a processing region of a three-dimensional modeling device according to another modification example.

A three-dimensional modeling device 1D of Modification Example 2 may form three sets of processing regions as illustrated in FIG. 9. A processing section 6D forms processing regions 76A, 76B, and 76C. These processing regions are disposed at equal intervals (120 degrees). For example, the processing region 76A has a supply region 77 similar to the supply region of the processing region 40A of the second embodiment, a preheating region 78, an outer peripheral modeling region 79, and an inner peripheral modeling region 81. It should be noted that the processing region 76A may have the same configuration as the processing region 32A of the first embodiment. The processing region 76A may have the same configuration as the processing region 53A of the third embodiment. Even with such configurations, it is possible to perform the supply operation, the preheating operation, and the modeling operation in parallel. Accordingly, the modeling time can be shortened.

Even in the configuration in which the postheating is performed, only the constituent element that is necessary may be operated and the operation of the constituent element that is unnecessary may be stopped depending on the shape of the model as for the preheating unit, the beam providing unit, and the postheating unit. The configuration in which the postheating is performed is a configuration including, for example, the three-dimensional modeling device 1B illustrated in FIGS. 6 and 7 and the three-dimensional modeling device 1C illustrated in FIG. 8. In other words, those to be used among the plurality of preheating units, the plurality of beam providing units, and the postheating unit may be selected in accordance with the shape of the model. Switching may be performed to a state where all are used. For example, the preheating, melting, and postheating in the outer peripheral region 101a and the preheating, melting, and postheating in the inner peripheral region 101b do not necessarily have to be performed together with respect to the same powder layer depending on the shape of the model.

Figure 6:
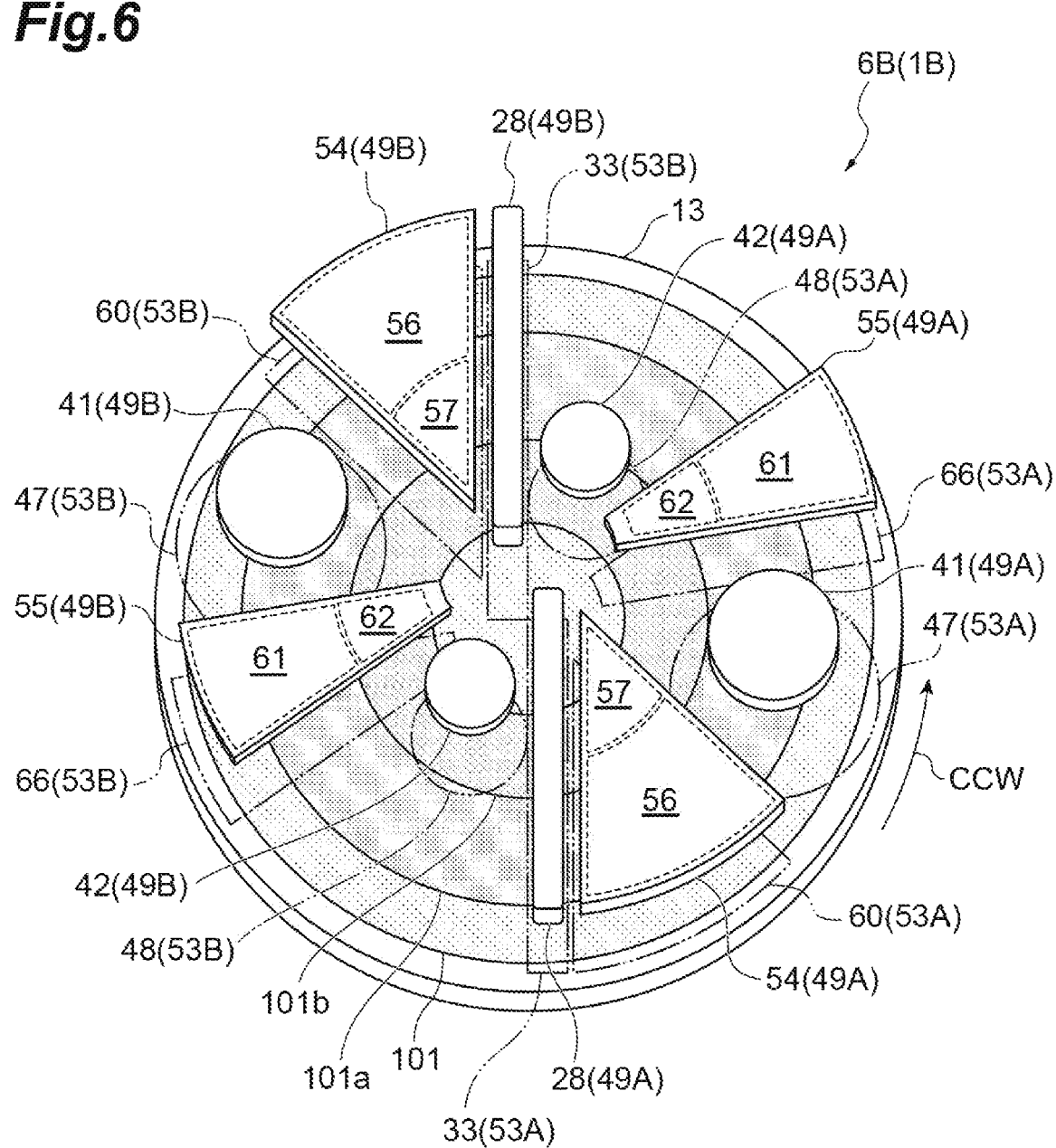
FIG. 6 is a diagram illustrating a processing section of a three-dimensional modeling device according to a third embodiment.
Figure 7:
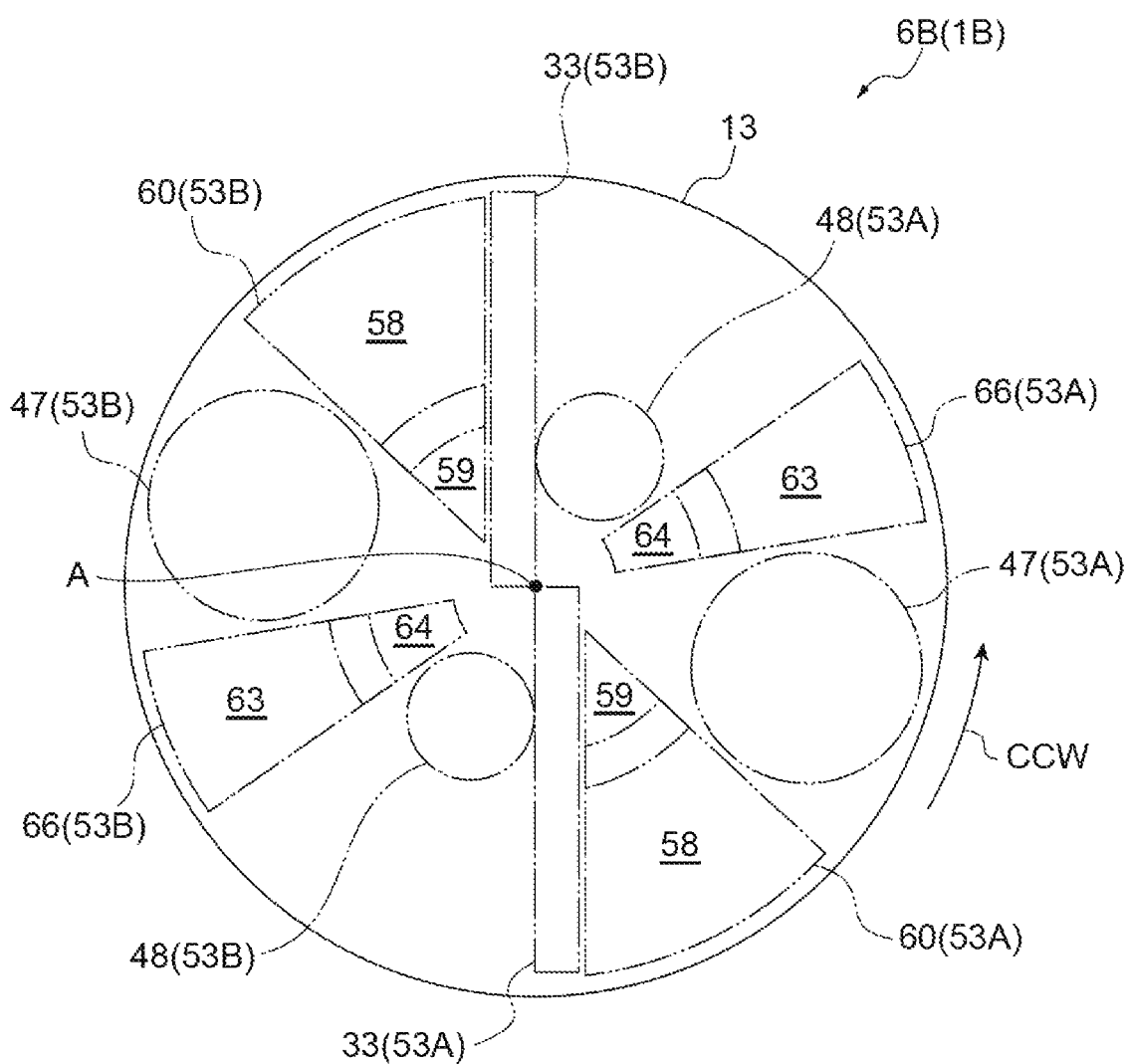
FIG. 7 is a diagram illustrating a processing region in the modeling device of FIG. 6.

Also in the three-dimensional modeling device 1B illustrated in FIGS. 6 and 7, modeling in the outer peripheral region 101a may be performed without modeling in the inner peripheral region 101b being performed at the part where the outer diameter of the model is large. In other words, at the part where the outer diameter of the model is large, the operations of the second preheating unit 57, the inside beam source 42, and the third preheating unit 62 may be stopped and modeling in the outer peripheral region 101a may be performed. Further, at the part where the outer diameter of the model is small, modeling in the inner peripheral region 101b may be performed without modeling in the outer peripheral region 101a being performed. In other words, at the part where the outer diameter of the model is small, modeling in the inner peripheral region 101b may be performed and the operations of the first preheating unit 56, the outside beam source 41, and the first postheating unit 61 may be stopped.

Also in the three-dimensional modeling device 1C illustrated in FIG. 8, modeling in the outer peripheral region 101a may be performed without modeling in the inner peripheral region 101b being performed at the part where the outer diameter of the model is large. In other words, at the part where the outer diameter of the model is large, the operations of the third heater 84 for preheating, the seventh heater 89, the inside beam source 42, the fourth heater 86 for postheating, and the eighth heater 91 may be stopped and modeling in the outer peripheral region 101a may be performed. Further, at the part where the outer diameter of the model is small, modeling in the inner peripheral region 101b may be performed without modeling in the outer peripheral region 101a being performed. In other words, at the part where the outer diameter of the model is small, the operations of the first heater 82 for preheating, the fifth heater 87, the outside beam source 41, the second heater 83 for postheating, and the sixth heater 88 may be stopped.

In addition, for example, the beam source 31 may be provided so as to be movable in the diameter direction of the table 13. In this configuration, the beam source 31 may be configured to be mutually movable to a position where the outer peripheral region is heated and a position where the inner peripheral region is heated. The position of the beam source 31 may be selected in accordance with, for example, the shape of the model. In other words, the radial position of the beam source 31 may be adjusted for each powder layer by the beam source 31 being moved in accordance with the shape of the model.

In addition, for example, the lowering operation may not be performed in parallel with the preheating operation and the modeling operation. The control unit 4 performs the supply, preheating, modeling, and rotation operations in parallel. Meanwhile, the lowering operation is not performed in parallel with the supply, preheating, modeling, and rotation operations. With this control, it is possible to obtain a model that has a structure in which thin disks are laminated.

Each element constituting the three-dimensional modeling device may be replaced with another constituent element capable of fulfilling the required function. For example, an electron beam or laser may be used for the preheating operation. For example, in the preheating unit, an electron gun or a laser generating device may be used instead of, for example, the heaters 29 and 39. An electron beam or laser may be used for the postheating operation. For example, in the postheating unit, an electron gun or a laser generating device may be used instead of, for example, the downstream heater 55, the second heater 83 for postheating, the fourth heater 86, the sixth heater 88, and the eighth heater 91.

In the above embodiments, the powder material is melted by being irradiated with an electron beam. However, the beam with which the powder material is irradiated is not limited to the electron beam. In other words, the beam with which the powder material is irradiated may be another energy beam. In other words, the beam that is used in the three-dimensional lamination modeling device may be an energy beam capable of supplying energy to the powder material 101. For example, the device may be a modeling device to which a laser melting method is applied. The beam that is used in the three-dimensional lamination modeling device may be a laser beam. The beam that is used in the three-dimensional lamination modeling device may be a charged particle beam, which is a concept including an electron beam and an ion beam.

A configuration in which the table 13 rotates counterclockwise has been exemplified in the above embodiments. The direction of rotation of the table 13 is not limited to the counterclockwise direction. For example, the table 13 may rotate clockwise.

REFERENCE SIGNS LIST 1, 1A, 1B, 1C, 1D: three-dimensional modeling device, 3: drive unit, 4: control unit, 6: processing section, 6A, 6B, 6C, 6D: processing section, 7: column, 8: housing, 13: table, 13a: modeling surface (main surface), 14: modeling tank, 15: rotation unit (rotation drive unit), 16: lifting-lowering unit (linear drive unit), 27A, 27B: processing unit, 28: feeder (material supply unit), 29: heater, 31: beam source (first beam providing unit, second beam providing unit), 32A, 32B: processing region, 33: supply region, 34: preheating region, 36: modeling region, 37a: first region, 37b: second region, 37c: third region, 37d: fourth region, 37e: fifth region, 37f: sixth region, 38A, 38B: processing unit, 39: heater, 41: outside beam source, 42: inside beam source, 40A, 40B: processing region, 44: outer peripheral preheating region, 46: inner peripheral preheating region, 47: outer peripheral modeling region, 48: inner peripheral modeling region, 49A, 49B: processing unit, 50: comprehensive preheating region, 51: first preheating unit, 52: second preheating unit, 53A, 53B: processing region, 54: upstream heater, 55: downstream heater, 56: first preheating unit, 57: second preheating unit, 58: outer peripheral preheating region, 59: upstream inner peripheral preheating region, 60: upstream heating region, 61: first postheating unit, 62: third preheating unit, 63: outer peripheral postheating region, 64: downstream inner peripheral preheating region, 66: downstream heating region, 67A, 67B: processing region, 68: outer peripheral preheating region, 69: outer peripheral modeling region, 71: outer peripheral postheating region, 72: inner peripheral preheating region, 73: inner peripheral modeling region, 74: inner peripheral postheating region, 76A, 76B, 76C: processing region, 77: supply region, 78: preheating region, 79: outer peripheral modeling region, 81: inner peripheral modeling region, 101: powder material, 101S: model, 101a: outer peripheral region, 101b: inner peripheral region, A: rotary axis, CCW: counterclockwise direction, S: modeling space.

The invention claimed is:

1. A three-dimensional modeling device comprising:
a table supporting a powder material and a model created from the powder material;
a processing section disposed so as to face the table and obtaining the model by processing the powder material; and
a rotation drive unit including a motor, the motor configured to cause one of the table and the processing section to rotate relative to the other around a rotary axis, wherein
the processing section has a plurality of processing units disposed around the rotary axis,
the processing units including a feeder, one or more heaters, and one or more electron guns, the feeder configured to supply the powder material to the table, the heater configured to preheat the supplied powder material, and the electron gun configured to emit an energy beam to the preheated powder material,
the processing units including a first beam providing unit and a second beam providing unit providing the energy beam with the respective electron guns,
wherein a distance from the rotary axis to the second beam providing unit is shorter than a distance from the rotary axis to the first beam providing unit,
the first beam providing unit is disposed upstream of the second beam providing unit along a direction of rotation provided by the rotation drive unit, and
a first modeling region has an area larger than an area of a second modeling region, the first modeling region formed by irradiation of the energy beam by the first beam providing unit, the second modeling region formed by irradiation of the energy beam by the second beam providing unit.

2. The three-dimensional modeling device according to claim 1, wherein the processing unit has a first preheating unit and a second preheating unit including respective heaters, the heaters preheating the powder material,
the first preheating unit and the first beam providing unit are disposed in this order along a direction of rotation provided by the rotation drive unit, and
the second preheating unit and the second beam providing unit are disposed in this order along the direction of rotation provided by the rotation drive unit.

3. The three-dimensional modeling device according to claim 2, wherein the processing unit has a first postheating unit and a second postheating unit including respective heaters, the heaters postheating the model,
the first beam providing unit and the first postheating unit are disposed in this order along the direction of rotation provided by the rotation drive unit, and
the second beam providing unit and the second postheating unit are disposed in this order along the direction of rotation provided by the rotation drive unit.

4. The three-dimensional modeling device according to claim 3, wherein a temperature of the powder material preheated by the first preheating unit is equal to a temperature of the model heated by the first postheating unit.

5. The three-dimensional modeling device according to claim 3, wherein the temperature of the powder material preheated by the first preheating unit is different from the temperature of the model heated by the first postheating unit.

6. The three-dimensional modeling device according to claim 4, wherein a temperature of the powder material preheated by the second preheating unit is equal to a temperature of the model heated by the second postheating unit.

7. The three-dimensional modeling device according to claim 4, wherein a temperature of the powder material preheated by the second preheating unit is different from a temperature of the model heated by the second postheating unit.

8. The three-dimensional modeling device according to claim 1, further comprising a control unit controlling the processing section and the rotation drive unit, wherein
the processing unit has:
a material supply unit supplying the powder material to a supply region set on a main surface of the table; and
a beam providing unit emitting the energy beam to a modeling region set downstream of the supply region along a direction of rotation provided by the rotation drive unit on the main surface of the table, and
the control unit
controls the rotation drive unit to perform a rotation operation of rotating one of the table and the processing section relative to the other,
controls the material supply unit to perform a supply operation of supplying the powder material to the supply region, and
controls the beam providing unit to perform a modeling operation of emitting the energy beam to the modeling region.

9. The three-dimensional modeling device according to claim 8, wherein the control unit performs the rotation operation, the supply operation, and the modeling operation in parallel.

10. The three-dimensional modeling device according to claim 8, further comprising a linear drive unit relatively changing a distance between the table and the processing section,
wherein the control unit controls the linear drive unit to perform a separation operation of increasing the distance from the table to the processing section along the rotary axis.

11. The three-dimensional modeling device according to claim 10, wherein the control unit performs the rotation operation, the supply operation, the modeling operation, and the separation operation in parallel.

12. The three-dimensional modeling device according to claim 10, wherein the control unit performs the separation operation after performing the rotation operation, the supply operation, and the modeling operation in parallel.

* * * * *